(12) United States Patent
Murthy

(10) Patent No.: US 8,868,482 B2
(45) Date of Patent: Oct. 21, 2014

(54) INFERRING SCHEMAS FROM XML DOCUMENT COLLECTIONS

(75) Inventor: Ravi Murthy, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 412 days.

(21) Appl. No.: 12/052,510

(22) Filed: Mar. 20, 2008

(65) Prior Publication Data

US 2009/0240712 A1    Sep. 24, 2009

(51) Int. Cl.
*G06F 17/30* (2006.01)
(52) U.S. Cl.
CPC ............... *G06F 17/30914* (2013.01)
USPC ........................... 707/601; 707/803
(58) Field of Classification Search
USPC ............................... 707/601, 803
See application file for complete search history.

(56) References Cited

U.S. PATENT DOCUMENTS

| | | | |
|---|---|---|---|
| 6,366,934 B1 | 4/2002 | Cheng et al. | |
| 6,421,656 B1 | 7/2002 | Cheng et al. | |
| 6,519,597 B1 | 2/2003 | Cheng et al. | |
| 6,973,460 B1 * | 12/2005 | Mitra ..................................... | 1/1 |
| 6,996,576 B2 * | 2/2006 | Vos et al. ....................... | 707/688 |
| 7,103,590 B1 * | 9/2006 | Murthy et al. ......................... | 1/1 |
| 7,120,645 B2 * | 10/2006 | Manikutty et al. ..................... | 1/1 |
| 7,472,108 B2 * | 12/2008 | Lim et al. .............................. | 1/1 |
| 7,596,559 B2 | 9/2009 | Popa et al. | |
| 2002/0116371 A1 | 8/2002 | Dodds et al. | |
| 2003/0014397 A1 | 1/2003 | Chau et al. | |
| 2003/0140308 A1 | 7/2003 | Murthy et al. | |
| 2004/0064466 A1 * | 4/2004 | Manikutty et al. ............ | 707/100 |
| 2004/0068527 A1 | 4/2004 | Smith, III | |
| 2004/0083209 A1 | 4/2004 | Shin | |
| 2004/0128296 A1 | 7/2004 | Krishnamurthy et al. | |
| 2004/0143581 A1 * | 7/2004 | Bohannon et al. ............ | 707/100 |
| 2004/0210573 A1 | 10/2004 | Abe et al. | |
| 2004/0243555 A1 * | 12/2004 | Bolsius et al. .................... | 707/3 |
| 2005/0005261 A1 | 1/2005 | Severin | |
| 2005/0055355 A1 | 3/2005 | Murthy et al. | |
| 2005/0102672 A1 * | 5/2005 | Brothers ........................... | 718/1 |
| 2005/0120031 A1 | 6/2005 | Ishii | |
| 2005/0160110 A1 * | 7/2005 | Charlet et al. ................ | 707/102 |
| 2005/0203933 A1 * | 9/2005 | Chaudhuri et al. ........... | 707/101 |
| 2005/0228792 A1 | 10/2005 | Chandrasekaran et al. | |
| 2005/0228828 A1 | 10/2005 | Chandrasekar et al. | |
| 2005/0229158 A1 | 10/2005 | Thusoo et al. | |
| 2005/0240624 A1 * | 10/2005 | Ge et al. ..................... | 707/104.1 |
| 2006/0036637 A1 * | 2/2006 | Sayal et al. ................... | 707/102 |
| 2006/0080345 A1 | 4/2006 | Murthy et al. | |
| 2006/0106746 A1 * | 5/2006 | Stuhec ............................. | 707/1 |
| 2006/0117033 A1 * | 6/2006 | Apparao et al. ............. | 707/100 |

(Continued)

OTHER PUBLICATIONS

Dalamagas et al., "Clustering XML Documents Using Structural Summaries", Springer Berlin/Heidelberg, vol. 3268/2005, 10 pages.

(Continued)

*Primary Examiner* — Son T Hoang
(74) *Attorney, Agent, or Firm* — Hickman Palermo Truong Becker Bingham Wong LLP

(57) ABSTRACT

In an automated fashion, a collection of XML documents are traversed and statistical data is generated describing hierarchical relationships of the elements, the elements data types and values. Based the analysis, an XML schema is derived such that the collection of XML documents conforms to the schema to a certain degree.

14 Claims, 2 Drawing Sheets

(56) References Cited

U.S. PATENT DOCUMENTS

| | | |
|---|---|---|
| 2006/0117250 A1* | 6/2006 | Rothschiller et al. ......... 715/513 |
| 2006/0143557 A1 | 6/2006 | Chan et al. |
| 2006/0212420 A1 | 9/2006 | Murthy |
| 2007/0011167 A1 | 1/2007 | Krishnaprasad et al. |
| 2007/0016605 A1 | 1/2007 | Murthy et al. |
| 2007/0112813 A1 | 5/2007 | Beyer et al. |
| 2007/0112851 A1 | 5/2007 | Tomic et al. |
| 2007/0239681 A1 | 10/2007 | Krishnaprasad et al. |
| 2007/0260650 A1* | 11/2007 | Warner et al. ................. 707/204 |
| 2007/0271218 A1* | 11/2007 | Lim et al. ........................ 707/2 |
| 2007/0271243 A1* | 11/2007 | Fan et al. ........................ 707/3 |
| 2007/0271305 A1* | 11/2007 | Chandrasekar et al. ...... 707/200 |
| 2008/0016122 A1* | 1/2008 | Liu et al. ...................... 707/200 |
| 2008/0082484 A1* | 4/2008 | Averbuch et al. ................. 707/3 |
| 2008/0082560 A1* | 4/2008 | Agrawal et al. ............... 707/101 |
| 2008/0091710 A1* | 4/2008 | Charlet et al. ................ 707/102 |
| 2008/0098020 A1 | 4/2008 | Gupta et al. |
| 2008/0120608 A1* | 5/2008 | Shetty et al. ................. 717/144 |
| 2008/0270380 A1* | 10/2008 | Ohrn et al. ........................ 707/5 |
| 2010/0030727 A1 | 2/2010 | Chandrasekar et al. |
| 2010/0228734 A1 | 9/2010 | Murthy |

OTHER PUBLICATIONS

Feng Peng and Sudarshan S. Chawathe, "XPath Queries on Streaming Data" (Proceedings of the 2003 ACM SIGMOD International Conference on Management of Data), pp. 431-442.

Alin Deutsch et al., "Reformulation of XML Queries and Constraints", ICDT 2003, pp. 225-241.

Hong Su et al., "Semantic Query Optimization for XQuery over XML Streams", Proceedings of the 31$^{st}$ VLDB Conference, Trondheim, Norway, 2005, pp. 277-288.

Attila Barta et al., "Benefits of Path Summaries in an XML Query Optimizer Supporting Multiple Access Methods", Proceedings of the 31$^{st}$ VLDB Conference, Trondheim, Norway, pp. 133-144.

U.S. Appl. No. 12/181,745, filed Jul. 29, 2008, Office Action, Nov. 9, 2010.

Kurtz et al., "Delta Compression Algorithms for Diverse Environments", 2006, 8 pages.

U.S. Appl. No. 12/391,818, filed Feb. 24, 2009, Notice of Allowance, Oct. 4, 2013.

Adams et al., Oracle@XML DB Developer's Guide 11g Release, dated May 1, 2008, 972 pages.

\* cited by examiner

INFERRING SCHEMAS FROM XML DOCUMENT COLLECTIONS

RELATED APPLICATIONS

The present application is related to U.S. patent application Ser. No. 11/184,302, A Mechanism For Computing Structural Summaries Of XML Document Collections In A Database System, filed on Jul. 18, 2005 by Ravi Murthy, et al., the entire content of which are herein incorporated by reference.

FIELD OF THE INVENTION

The present invention relates to processing XML data.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Extensible Markup Language (XML) is the standard for data and documents that is finding wide acceptance in the computer industry. XML describes and provides structure to a body of data, such as a file or data packet. The XML standard provides for tags that delimit sections of a XML entity referred to as XML elements. The following XML document A is provided to illustrate XML.

| XML document A |
|---|
| <a c="foo"> |
| <b>5</b> |
| <d>10</d> |
| </a> |

XML elements are delimited by a start tag and a corresponding end tag. For example, segment A contains the start tag <b> and the end tag </b> to delimit an element. The data between the elements is referred to as the element's content.

An element has a name and is referred to herein by its name. The name of the element delimited by <b> and the end tag </b> is b and is thus referred to herein as element b or just b.

An element's content may include the elements value, one or more attributes and one or more elements. Such an element is referred to as a complex element. Element a is a complex element, and contains two elements b and d. An element that is contained by another element is referred to as a descendant of that element. Thus, elements b and d are descendants of element a. An element's attributes are also referred to as being contained by the element. An element that contains no other elements is referred to as a simple or leaf element.

An attribute is a name value pair. Element a has attribute c, which has the value 'foo'.

Element b has the value 5 and element d has the value 10. Element a does not have a value.

By defining elements that contain attributes and descendant elements, a XML document defines a hierarchical tree relationship between the elements, descendant elements, and attributes of the elements.

Node Tree Model

XML documents are represented as a hierarchy of nodes that reflects the XML document's hierarchical nature. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes.

In a tree hierarchy or node tree, each child node has only one parent node, but a parent node may have multiple child nodes. A node that has no parent node linked to it is the root node, and a node that has no child nodes linked to it is a leaf node. A tree hierarchy has a single root node. In a node tree that represents a XML document, a node can correspond to an element, and the child nodes of the node correspond to an attribute or another element contained in the element.

For convenience of expression, an element and attribute of a XML document are referred to as the node that corresponds to that element or attribute within the node tree that represents the XML document. Thus, referring to 5 as the value of node b is just a way of expressing that the value of the element b is 5.

XML Schemas

Information about the structure of specific types of XML documents may be specified in documents referred to as "XML schemas". For example, the XML schema for a particular type of XML document contains declarations that specify the names for the elements contained in that type of XML document, the hierarchical relationship between the elements contained in that type of XML document, and the data type of values contained in that particular type of XML document. Standards governing XML schemas include: XML Schema, Part 0, Part 1, Part 2, W3C Recommendation, 2 May 2001, the contents of which are incorporated herein by reference; XML Schema Part 1: Structures, Second Edition, W3C Recommendation 28 Oct. 2004, the contents of which are incorporated herein by reference; XML Schema 1.1 Part 2: Datatypes, W3C Working Draft 17 Feb. 2006, the contents of which are incorporated herein by reference; and XML Schema Part 2: Datatypes Second Edition, W3C Recommendation 28 Oct. 2004, the contents of which incorporated herein by reference. XML Schemas as described in this document are not restricted to W3C XML Schemas but include any other mechanisms for describing the structural and/or typing information of XML documents, for example, Relax NG.

Often, for large bodies of XML documents, no XML schema document has been developed or engineered by developers. Described herein are approaches for automatically determining an XML schema to which a collection of XML documents may conform to varying degrees.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for presenting structural and typing information about XML documents is described. In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

Described herein are approaches to derive "optimal" XML schemas from XML document collections. There are various aspects as to what constitutes an "optimal" XML schema, which include:

(a) how precise or specific is the XML schema—the more explicit structure defined, and more specific datatypes defined other than string, the better the XML schema, (b) how many documents from the collection conform to the XML schema, the higher the number, the better the XML schema, (c) in the case of documents that do not conform to the XML schema, how are those documents different and how many differences are there.

A goal of deriving a XML schema is that the XML schema defines as much structural, data types, and facets or value constraints of the date types as plausible to describe XML documents in the collection. Data types include those explicitly defined by XML standards, including for example, integer, double, dateTime, or anyType. Facets include constraining facets, such as defined by XML Schema 1.1 Part 2, e.g., range of acceptable values (minimum and maximum values).

Two-Pass Approach to Automatically Deriving XML Schema

Figure 1:
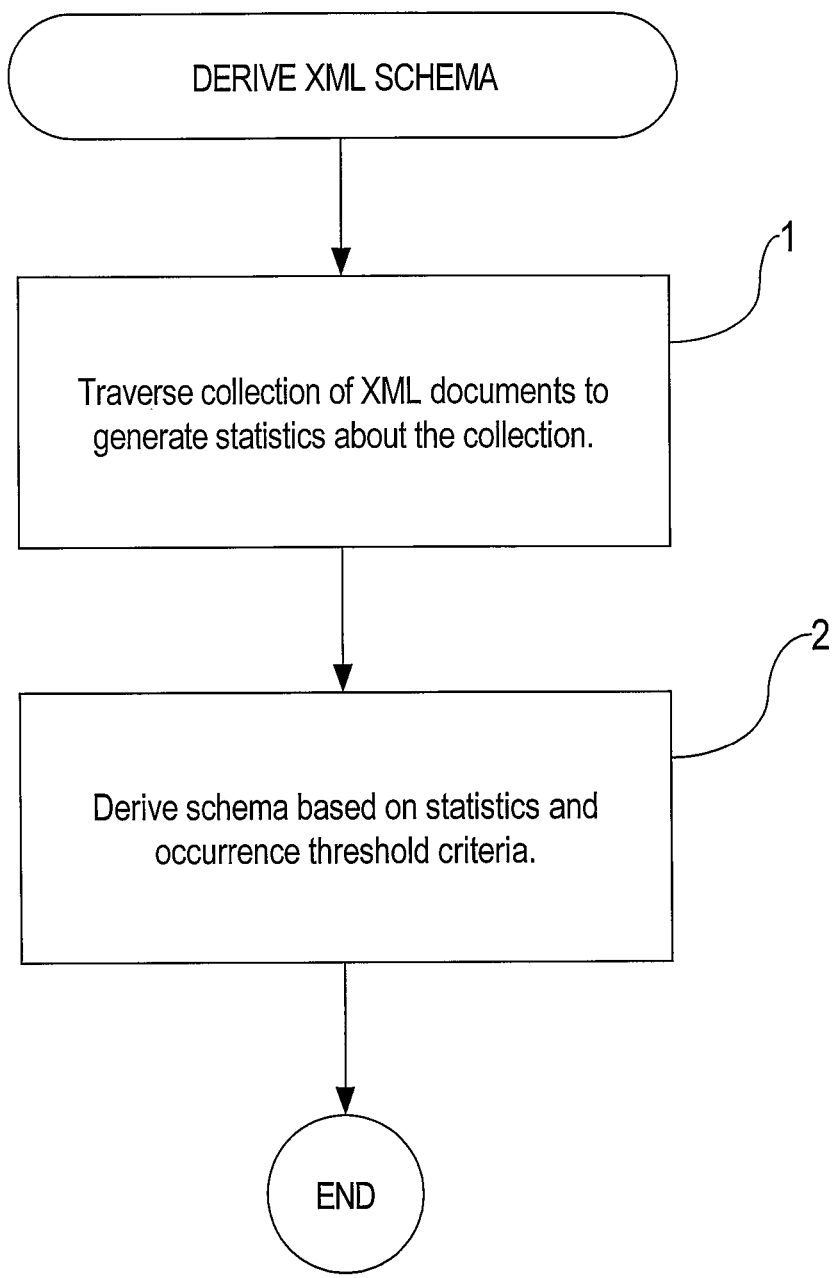
FIG. 1 is a flow chart of an approach for deriving an XML schema from a collection of XML documents.

FIG. 1 depicts a two pass approach for deriving a XML schema of a collection of documents. Referring to FIG. 1, in pass 1, all the documents in the collection are traversed and statistical data ("statistics") is generated describing data type relevant properties of the elements, which may include, for an element, the data types and/or information about different values encountered for that element. Also, for a complex element, the number of its occurrences is tracked. In addition, the number of occurrences of each of its children and/or descendants is also tracked. Information about values may include a summary of the values encountered, such as the specific values encountered and for each value, the number of occurrences.

For example, during pass 1, the statistics for a complex element A are as follows.

```
<A> --- [100]
    <B> --- [100]
    <C> --- [98]
    <foo> --- [1]
```

The above structural summary represents that complex element <A> has appeared 100 times in the collection. It has element <B> as a child in all 100 cases, element <C> as child in 98 cases, and element <foo> as a child in only 1 case.

In pass 2, the XML schema is derived based on examination and analysis of statistics along with an occurrence threshold. For example, the occurrence threshold is 5%. If an instance of a child element occurs in less than 5% of the instances of a complex element, then the child element is excluded from the derived XML schema. In this example, the derived XML schema for element <A> will include child elements <B> and <C>, but does not include <foo>. This ensures that a XML schema is not polluted by rare occurrences leading to overly complicated and/or large schemas.

The above is an example of how the hierarchical structural relationship between elements is derived. However, elements have other properties which may be derived from statistics and defined by an XML schema. According to an embodiment, one or more data types and one or more of the following facets may be derived from an XML schema for an element.

According to an embodiment, one or more of these properties may be associated with its' own occurrence threshold that is applied when determining whether to define the property for an element.

Datatype

For simple elements, the occurrences of datatypes and/or particular values are tracked in pass 1. For example, the statistics for scalar element <age> is as follows.

```
<age> [#occurrences = 100]
    -- integer [#occ = 99]
    -- string [#occ = 1]
```

In most instances of the element <age>, the element value is of the datatype integer, except in one case, where the element value is not an integer but is a string. Based on an occurrence threshold, it is assumed that the string value is an exception (e.g. a typo) and datatype for <age> is defined by the derived XML schema as an integer.

Value Range

During pass 2, values tracked by statistics for an element may be limited to a range (or maximum and minimum values). For example, the statistics indicate that the maximum value for the element age is 110. The derived XML schema could define a constraining facet for <age> limiting the values for the element to a maximum value of 110. According to an embodiment, an occurrence threshold is applied such that values that meet the threshold are covered by the constraining facet.

Value Enumeration

The statistics generated may track the fact that an element is set to only a limited set of values. For example, for the element <gender>, the statistics indicate that the values are set to 'M' or 'F'. The derived XML schema may define an enumeration value domain (i.e. set of values) limited to the values 'M' and 'F. According to an embodiment, any value that occurs at least as frequently as the occurrence threshold is a value defined as being in the value domain.

Character/String Pattern

Examination of the statistics generated may track the fact that element values conform to a particular set of string patterns. For example, most of the values for the element <account> conform to pattern 3N"-"4N" (a string of three digits and a string of four digits separated by a dash) or 7N (seven digits). These patterns together cover a threshold percentage of values, and the derived XML schema may be defined to constrain <account> to this pattern.

The lists of facets that may be derived listed above are illustrative and should not be construed as limiting.

Incremental Refinement

The statistics computed in the first pass may be stored persistently. As new documents are added to the collection, the derived XML schemas can be incrementally refined. The new documents may be traversed and statistics updated to reflect the structure and facets of the new documents. Next, the second pass is rerun based on the updated statistics, producing possibly a new version of the derived XML schema.

XML Schema Goodness Score.

The system provides a "goodness" (or "conformity") score for a derived XML schema. The score is based on the number of documents in the collection that conform to the derived XML schema versus the number of exceptions in the system. Based on this score, the occurrence threshold could be further adjusted and reconfigured.

For example, the two pass approach may be implemented in software, and the frequency threshold may be configured by user input received by the software. If the occurrence threshold of 10% results in a poor score for the derived XML schema, the threshold can be decreased to 5% in an attempt to create a more encompassing XML schema.

Hardware Overview

Figure 2:
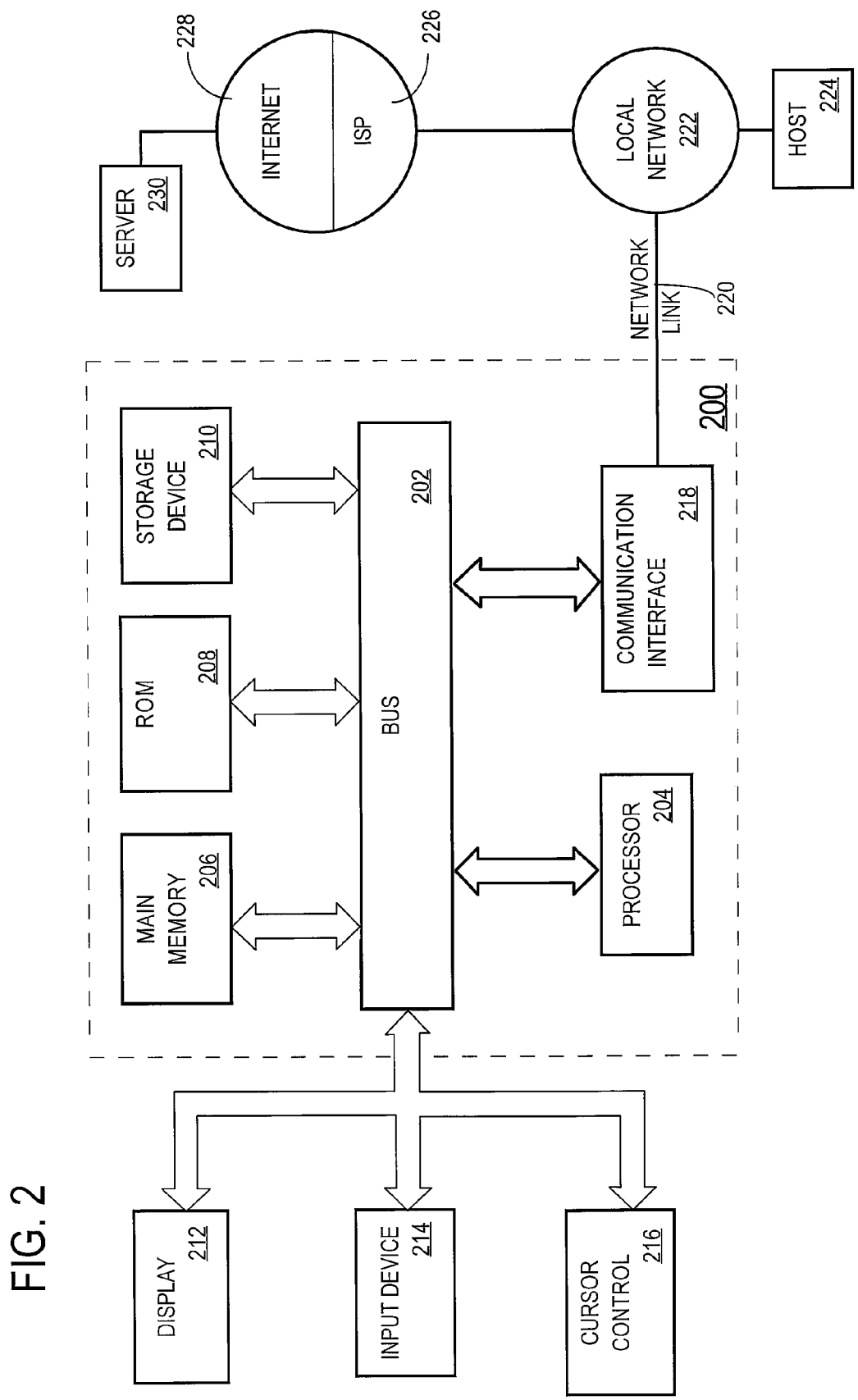
FIG. 2 is a block diagram of a computer system that may used to implement an embodiment of the present invention.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for inferring one or more schemas of a collection of (Extensible Markup Language) XML documents, comprising steps of:
    traversing a collection of XML documents to generate statistical data describing said collection of XML documents, said statistical data indicating numbers of occurrences of hierarchical structures, data types, and values of elements found in said collection of XML documents during said traversing said collection of XML documents; and
    wherein said collection of XML documents includes complex elements, each complex element of said complex elements containing at least one other element;
    based on an examination of said statistical data, generating a derived XML schema to which at least a portion of said collection of XML documents conform;
    wherein said generating said derived XML schema includes:
        making a first determination of whether said statistical data indicates that within a number of occurrences in said collection of XML documents of a particular complex element of said complex elements, whether a first descendant element occurs in at least a threshold portion of said number of occurrences;
        when said first determination is that said first descendant element does occur in at least said threshold portion of said number of occurrences, causing said derived XML schema to define said first descendant element; and
        when said first determination is that said first descendant element does not occur in at least said threshold portion of said number of occurrences, causing said derived XML schema to not define said first descendant element; and
    generating one or more values that reflect a degree to which said collection of XML documents conform to said derived XML schema; and
    wherein said steps are performed by one or more computing devices.

2. The method of claim 1, further comprising:
    traversing another set of XML documents to generate an updated version of the statistical data that describes both said another set of XML documents and said collection of XML documents; and
    based on an examination of said updated version of the statistical data, generating another version of the derived XML schema to which at least a portion of the another set of XML documents and collection of XML documents conform.

3. The method of claim 1, wherein said generating said derived XML schema includes:
    making a second determination that among instances of a certain element contained in said collection of XML documents that at least a threshold portion of said instances conform to a set of one or more data types; and
    in response to said second determination, causing said derived XML schema to define said element as said one or more data types.

4. The method of claim 1, wherein said generating said derived XML schema includes:
    making a second determination that among instances of a certain element contained in said collection of XML documents that at least a threshold portion of said instances conform to one or more value constraints; and
    in response to said second determination, causing said derived XML schema to define said one or more value constraints for said element.

5. The method of claim 4, wherein said one or more value constraints are based on at least one of a range;
    a minimum value; and
    a maximum value.

6. The method of claim 4, wherein said one or more value constraints are based on an enumeration of values.

7. The method of claim 4, wherein said one or more value constraints are based on a string pattern.

8. A non-transitory computer-readable medium storing one or more sequences of instructions for inferring one or more schemas of a collection of (Extensible Markup Language) XML documents, said one or more sequences of instructions, which, when executed by one or more processors, cause:
    traversing a collection of XML documents to generate statistical data describing said collection of XML documents, said statistical data indicating numbers of occurrences of hierarchical structures, data types, and values of elements found in said collection of XML documents during said traversing said collection of XML documents;
    wherein said collection of XML documents includes complex elements, each complex element of said complex elements containing at least one other element;
    based on an examination of said statistical data, generating a derived XML schema to which at least a portion of said collection of XML documents conform;
    wherein said generating said derived XML schema includes:
        making a first determination of whether said statistical data indicates that within a number of occurrences in said collection of XML documents of a particular complex element of said complex elements, whether a first descendant element occurs in at least a threshold portion of said number of occurrences;
        when said first determination is that said first descendant element does occur in at least said threshold portion of said number of occurrences, causing said derived XML schema to define said first descendant element; and
        when said first determination is that said first descendant element does not occur in at least said threshold portion of said number of occurrences, causing said derived XML schema to not define said first descendant element; and
    generating one or more values that reflect a degree to which said collection of XML documents conform to said derived XML schema.

9. The non-transitory computer-readable medium of claim 8, the instructions further including instructions for:
    traversing another set of XML documents to generate an updated version of the statistical data that describes both said another set of XML documents and said collection of XML documents; and
    based on an examination of said updated version of the statistical data, generating another version of the derived XML schema to which at least a portion of the another set of XML documents and collection of XML documents conform.

10. The non-transitory computer-readable medium of claim 8, wherein said generating said derived XML schema includes:
  making a second determination that among instances of a certain element contained in said collection of XML documents that at least a threshold portion of said instances conform to a set of one or more data types; and
  in response to said second determination, causing said derived XML schema to define said element as said one or more data types.

11. The non-transitory computer-readable medium of claim 8, wherein said generating said derived XML schema includes:
  making a second determination that among instances of a certain element contained in said collection of XML documents that at least a threshold portion of said instances conform to one or more value constraints; and
  in response to said second determination, causing said derived XML schema to define said one or more value constraints for said element.

12. The non-transitory computer-readable medium of claim 11, wherein said one or more value constraints are based on at least one of a range;
  a minimum value; and
  a maximum value.

13. The non-transitory computer-readable medium of claim 11, wherein said one or more value constraints are based on an enumeration of values.

14. The non-transitory computer-readable medium of claim 11, wherein said one or more value constraints are based on a string pattern.

\* \* \* \* \*

UNITED STATES PATENT AND TRADEMARK OFFICE
CERTIFICATE OF CORRECTION

PATENT NO. : 8,868,482 B2
APPLICATION NO. : 12/052510
DATED : October 21, 2014
INVENTOR(S) : Murthy Page 1 of 1

It is certified that error appears in the above-identified patent and that said Letters Patent is hereby corrected as shown below:

In the Claims

In column 7, line 31, in Claim 1, after "elements," delete "whether".

In column 8, line 41, in Claim 8, after "elements," delete "whether".

Signed and Sealed this
Fourteenth Day of July, 2015

Michelle K. Lee
*Director of the United States Patent and Trademark Office*